(12) United States Patent
Zenta

(10) Patent No.: US 6,615,981 B2
(45) Date of Patent: Sep. 9, 2003

(54) DISC CASE

(75) Inventor: Oguchi Zenta, Saitama-ken (JP)

(73) Assignee: Oguchi Book Binding & Printing Co., Ltd., Saitama-ken (JP)

(*) Notice: Subject to any disclaimer, the term of this patent is extended or adjusted under 35 U.S.C. 154(b) by 0 days.

(21) Appl. No.: 10/026,521

(22) Filed: Dec. 27, 2001

(65) Prior Publication Data

US 2003/0121807 A1 Jul. 3, 2003

(51) Int. Cl.[7] .............................................. B65D 85/57
(52) U.S. Cl. ..................................... 206/308.1; 206/312
(58) Field of Search ..................... 206/308.1, 310–313, 206/488, 490

(56) References Cited

U.S. PATENT DOCUMENTS

| | | | | |
|---|---|---|---|---|
| 4,771,890 A | * | 9/1988 | Hofland et al. | 206/308.1 |
| 5,186,327 A | * | 2/1993 | McCafferty et al. | 206/308.1 |
| 5,419,433 A | * | 5/1995 | Harrer et al. | 206/312 |
| 5,460,265 A | * | 10/1995 | Kiolbasa | 206/308.1 |
| 5,749,463 A | * | 5/1998 | Collins | 206/308.1 |
| 6,044,969 A | * | 4/2000 | Denize et al. | 206/308.1 |
| 6,164,446 A | * | 12/2000 | Law | 206/308.1 |

* cited by examiner

Primary Examiner—Luan K. Bui
(74) Attorney, Agent, or Firm—Wenderoth, Lind & Ponack, L.L.P.

(57) ABSTRACT

A disc case comprises a paper board and permits smoothly accommodating and removing a disc without provision of any notch that exposes part of the disc edge, and can perfectly protect the accommodated disc without exposure thereof to the outside. The board has an upper disc accommodation recess 3 for accommodating a disc 4 such as a compact disc, also has flanges 17 extending from the top edge of the disc accommodation recess 3 for contacting with the top edge of the accommodated disc 4 and preventing occasional detachment thereof. The board further has a finger access recess 5 that extends from part of the edge of the disc accommodation recess 3 so as to be flush with the bottom therewith for accommodating and removing the disc 4.

13 Claims, 6 Drawing Sheets

DISC CASE

BACKGROUND OF THE INVENTION

1. Field of the Invention

This invention relates to disc cases for accommodating such discs as compact discs and, more particularly, to a disc case, which is made of paper, permits smoothly accommodating and taking out a disc and can reliably hold the disc accommodated in a stable state of protection.

2. Prior Art

Recently, a variety of discs such as musical compact discs, DVDs and personal computer CD-ROMs are accommodated for circulation in disc cases of various forms. Many usual disc cases for accommodating compact discs and like discs are synthetic resin moldings, which have a center holder part provided at the center for engaging with the center hole of an inserted disc.

From the standpoint of coping with recent environmental pollution, however, such synthetic resin products pose problems in their discarding or disposal. In view of the discarding or disposal, products capable of being recycled or developing products of materials free from generation of harmful matter by burning have been desired. To meet this demand, disc cases made of paper have been developed.

FIGS. 5 and 6 show a prior art disc case made of paper.

The illustrated disc case 100 is in the form of a board, which has a recess 102 formed in its central part for accommodating a disc 101 and a notch 103 formed as a finger access part, which exposes part of the edge of the accommodated disc 101, that is, which is formed for accommodating removing the disc 101. This disc case 100 of paper is manufactured by bonding together a plurality of paper sheets, for instance a bottom, an intermediate and a top sheet 100a to 100c, to provide a predetermined thickness.

However, this prior art disc case has the following problems. Bonding together of a plurality of sheets individually having the notches 103, causes expansion or contraction of the individual sheets and results in a wavy form of the resultant board without alignment of the individual component sheets. That is, it is extremely difficult to line up the edges of the notches 103. Therefore, in addition to the operation of forming the notches in the individual component sheets, a difficult shaping operation is required to line up the individual component sheets after the bonding thereof.

In addition, although the prior art disc case having the notch as the finger access part permits conveniently accommodating and removing a disc, it has a disadvantage in that the accommodated disc is subject to scars and scratches from the outside due to partial exposure in the notch. This is the most significant drawback in view of the function of perfect protection, which is required for this type of disc case. Besides, dust particles may enter through the notch and be attached to the accommodated disc. It is thus difficult to maintain the seal which is most necessary for this type of disc case.

Furthermore, disc cases of the type to be filed in books have like problems. Specifically, the presence of the notch as the finger access part gives rise to the fatal drawbacks from the standpoint of disc protection, although it is convenient for accommodating and removing the disc.

SUMMARY OF THE INVENTION

A first object of the invention is to provide a disc case, which precludes the above drawbacks inherent in the prior art owing to the absence of any notch in the bottom, intermediate and top sheets that are bonded together in manufacture so as to be capable of being manufactured readily and accurately in a desired shape and to have desired dimensions. The invention permits smoothly accommodating and removing the disc without the presence, unlike the prior art disc case, of a notch as the finger access part that exposes part of the accommodated disc.

A second object of the invention is to provide a disc case, which can accommodate and protect a disc in a board without exposing any disc edge part from the case and while retaining the disc in a perfect protection state free from attachment of dust particles and also always in a stable state without the possibility of occasional detachment.

A third object of the invention is to provide a disc case, which is made of paper so as to sufficiently meet the demands of coping with environmental pollution, as well as having the thickness and rigidity comparable with those of the disc cases made of synthetic resin, which is capable of being manufactured to have the same dimensions as those of the disc cases made of synthetic resin so that it can be put together with CDs in the same rack in any shop, and which permits smoothly accommodating and removing the disc and sufficiently providing various functions required for this type of disc case.

DETAILED DESCRIPTION OF THE PREFERRED EMBODIMENTS

Figure 1:
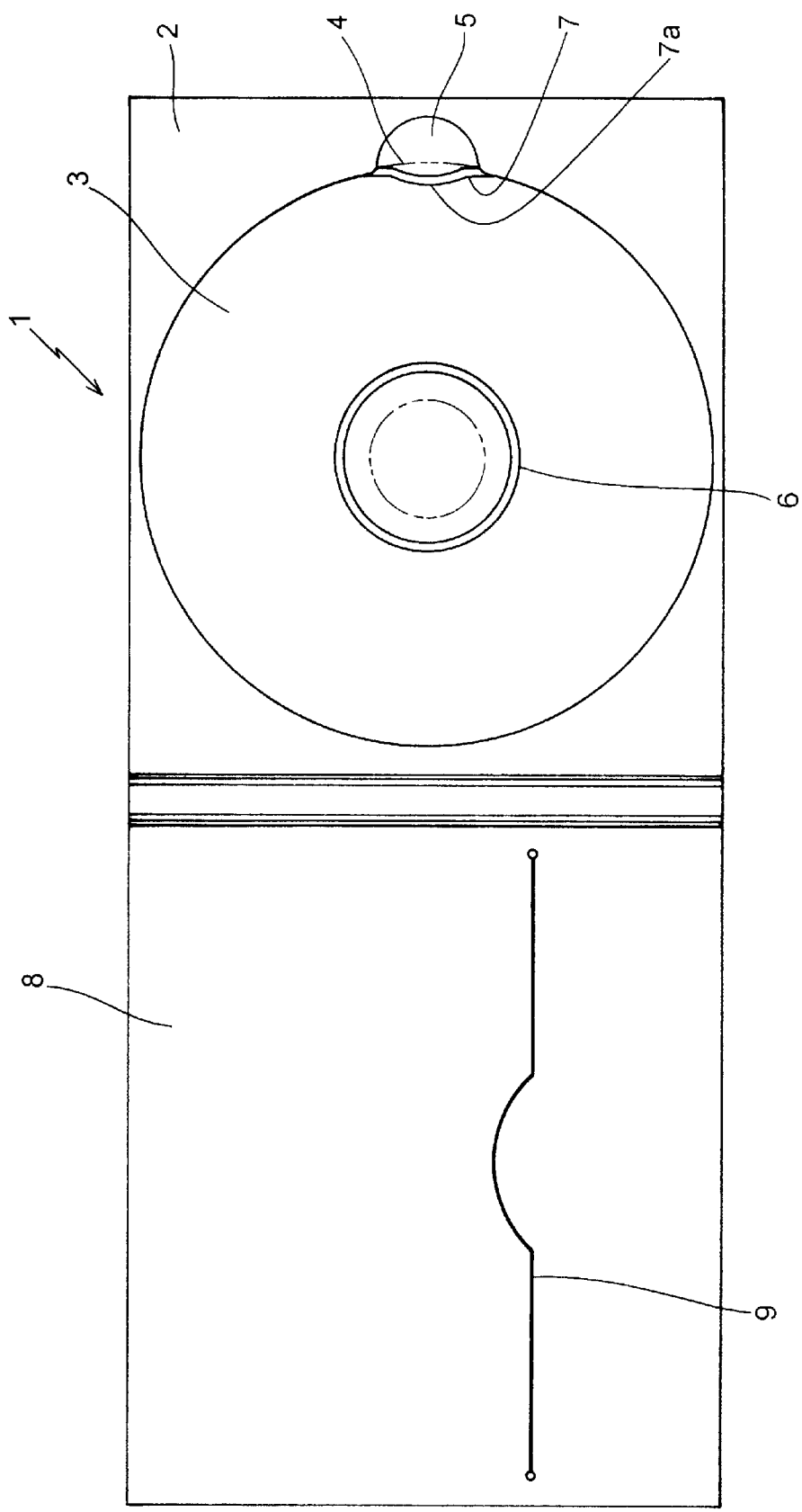
FIG. 1 is a plan view showing an embodiment of the disc case according to the invention.

An embodiment of the disc case according to the invention will now be described with reference to the drawings. Referring to FIG. 1, reference numeral 1 designates the disc case fully made of paper according to the invention. The disc case comprises a board 2, which has a central circular disc accommodation recess 3 for accommodating a disc 4 therein. Reference numeral 5 designates a recess as a finger access recess for accommodating and taking out the disc 4. The recess 5 has its bottom flush with the bottom of the disc accommodation recess 3 and extends from part of the edge of the recess 3. Reference numeral 6 designates a ring-like edge formed on the bottom center of the disc accommodation recess 3. The ring-like ridge 6 serves to have the accommodated disc 4 raised from the bottom of the disc accommodation recess 3.

Reference numeral 7 designates a ridge formed in the neighborhood of the boundary between the bottom of the finger access recess 5 and the bottom of the disc accommodation recess 3. The ridge 5 also serves to have the accommodated disc raised from the bottom.

The ridge 7 has a central curved portion 7a, which is curved or convex toward the center, i.e., toward the disc accommodation recess 3.

Reference numeral 8 is a lid fully made of paper. The lid can also function as a cover, and it is foldably joined to one side of the disc case 1 to cover the disc accommodation surface of the disc case 1.

Reference numeral 9 designates a jacket accommodation pocket provided on the inner surface of the cover 8.

Figure 2:
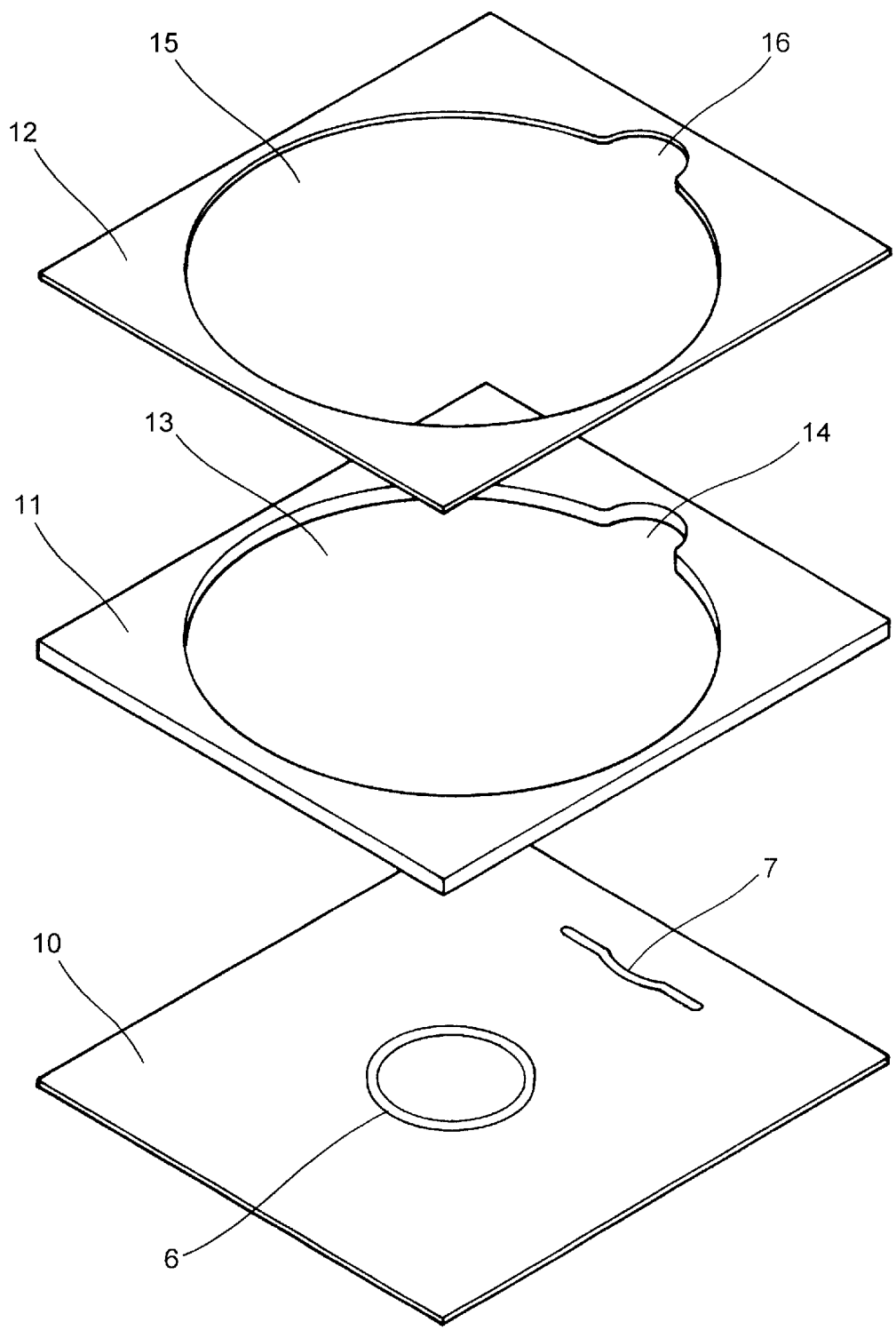
FIG. 2 is an exploded perspective view showing the disc case according to the invention.

As shown in FIG. 2, the disc case 1 is formed by bonding together a bottom, an intermediate and a top member 10 to 12. To provide a predetermined thickness of the disc case 1, the bottom, intermediate and top members 10 to 12 may each, rather than being a single sheet, be formed by bonding together a plurality of sheets.

As described before, the bottom member 10 has the central ring-like ridge 6 for holding the disc 4 raised and also has the ridge 7, which is spaced apart from and has the same role as the ring-like ridge 6 and has the central curved portion 7a convex toward the disc accommodation recess 3 so that a finger can be inserted, when taking out the accommodated disc 4, sufficiently deeply to easily take out the disc 4.

The intermediate member 11 has a circular opening 13, which forms part of the peripheral wall of the disc accommodation recess 3, and a semi-circular opening 14, which is continuous to the circular opening 13 and forms part of the wall of the finger access recess 5.

The top member 12 likewise has a circular opening 15 forming the wall of the disc accommodation recess 3 and a semi-circular opening 16 forming the wall of the finger access recess 5.

The diameter of the circular recess 13 in the intermediate member 11 is set to be greater than the outer disc diameter only very slightly in order to prevent as much as possible the movement of the disc 4 accommodated in the disc accommodation recess 3 in the clearance between the disc 4 and the wall of the disc accommodation recess 3.

The circular opening 15 in the top member 12 for forming the disc accommodation recess 3 is actually oval in order to form diametrically opposed side flanges 17 extending toward the accommodated disc from the top edge of the circular opening 13 in the intermediate member 11.

The flanges 17 are formed oppositely on both sides of the opening 16 in the top member 12 constituting the finger access recess. The sides of the recess 15 other than the sides with the flanges 17 may be flush with the peripheral wall of the circular opening 13 in the intermediate member 11 and free from any flange, or they may be formed with disc engagement flanges, which are very slight in width compared to the flanges 17.

Figure 3:
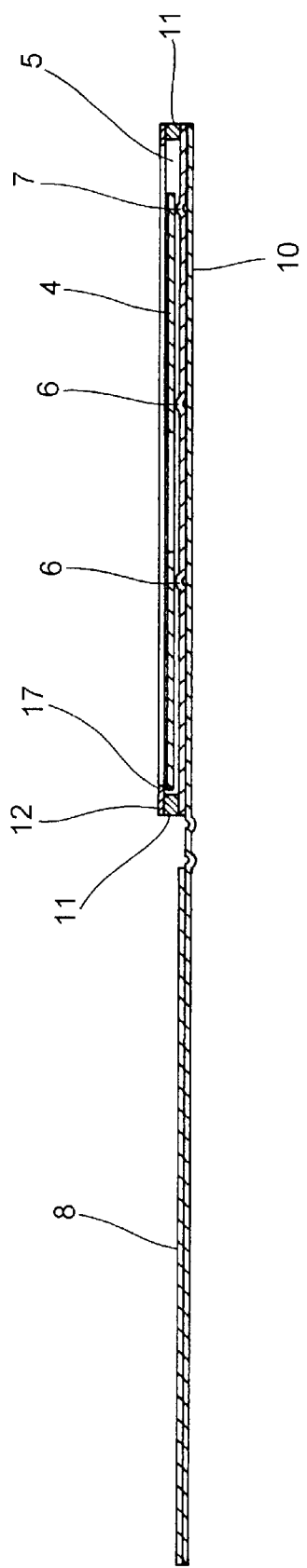
FIG. 3 is a sectional view showing the disc case according to the invention in the disc accommodation state.
Figure 4:
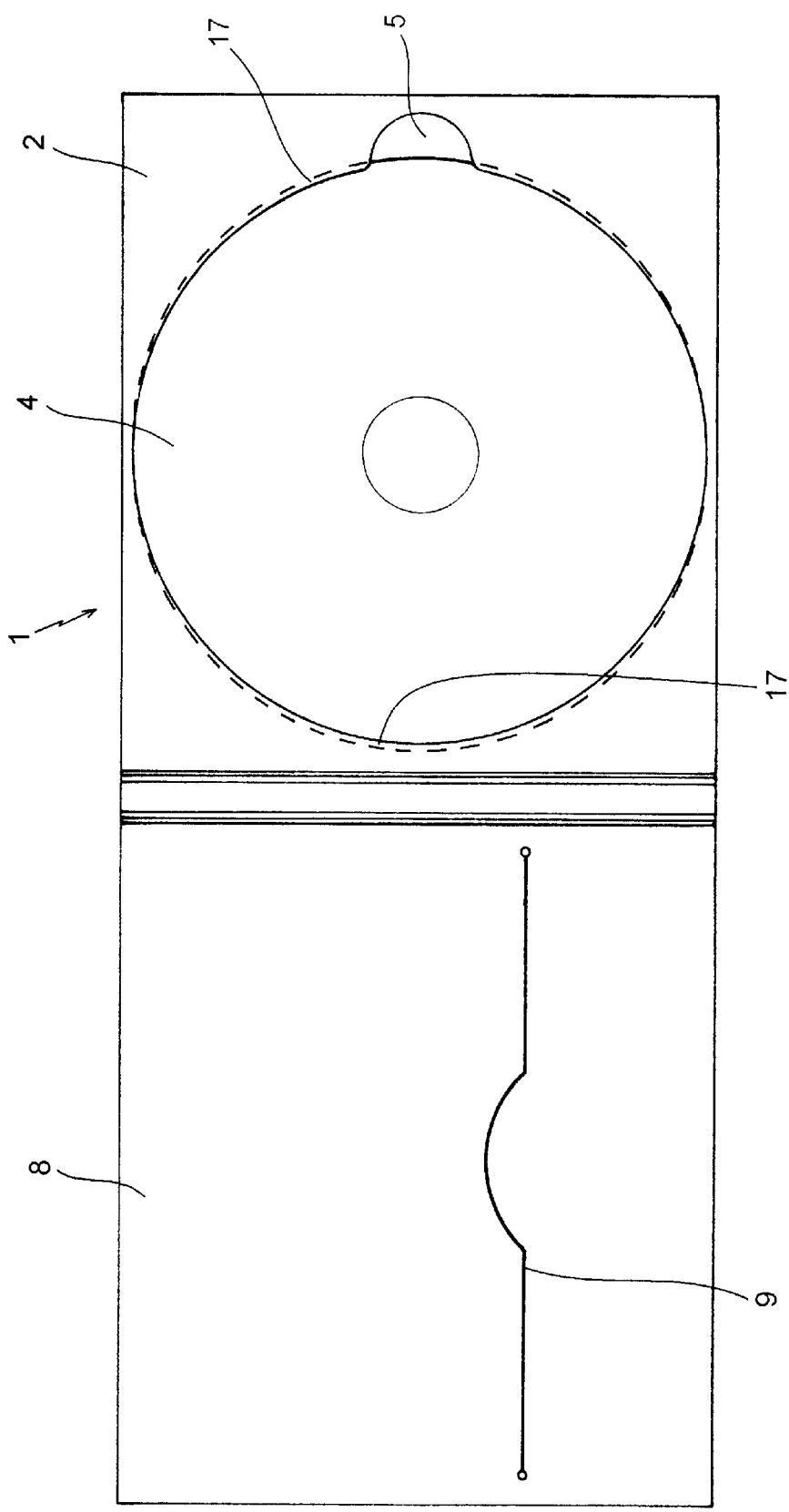
FIG. 4 is a plan view showing the disc case according to the invention in the disc accommodation state.
Figure 5:
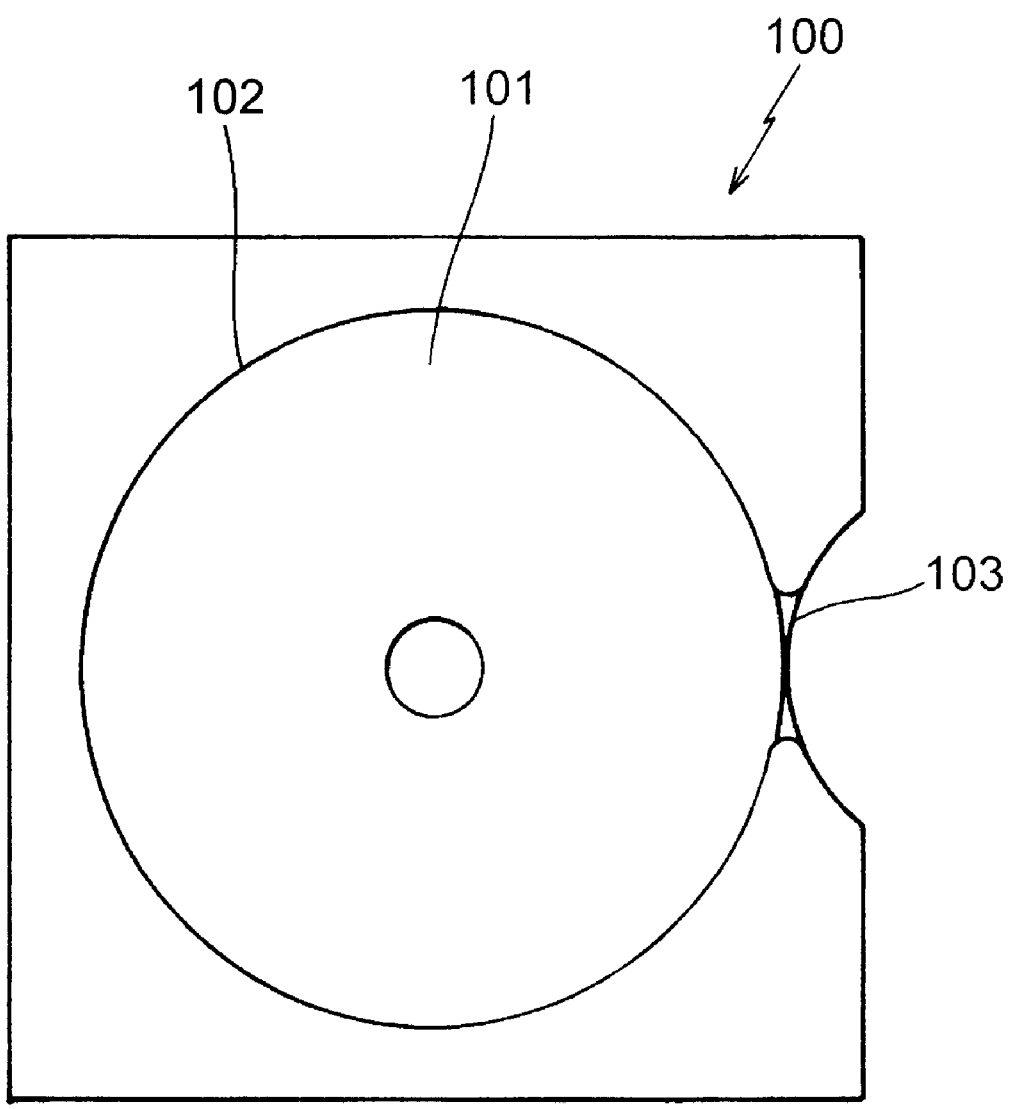
FIG. 5 is a plan view showing a prior art disc case.
Figure 6:
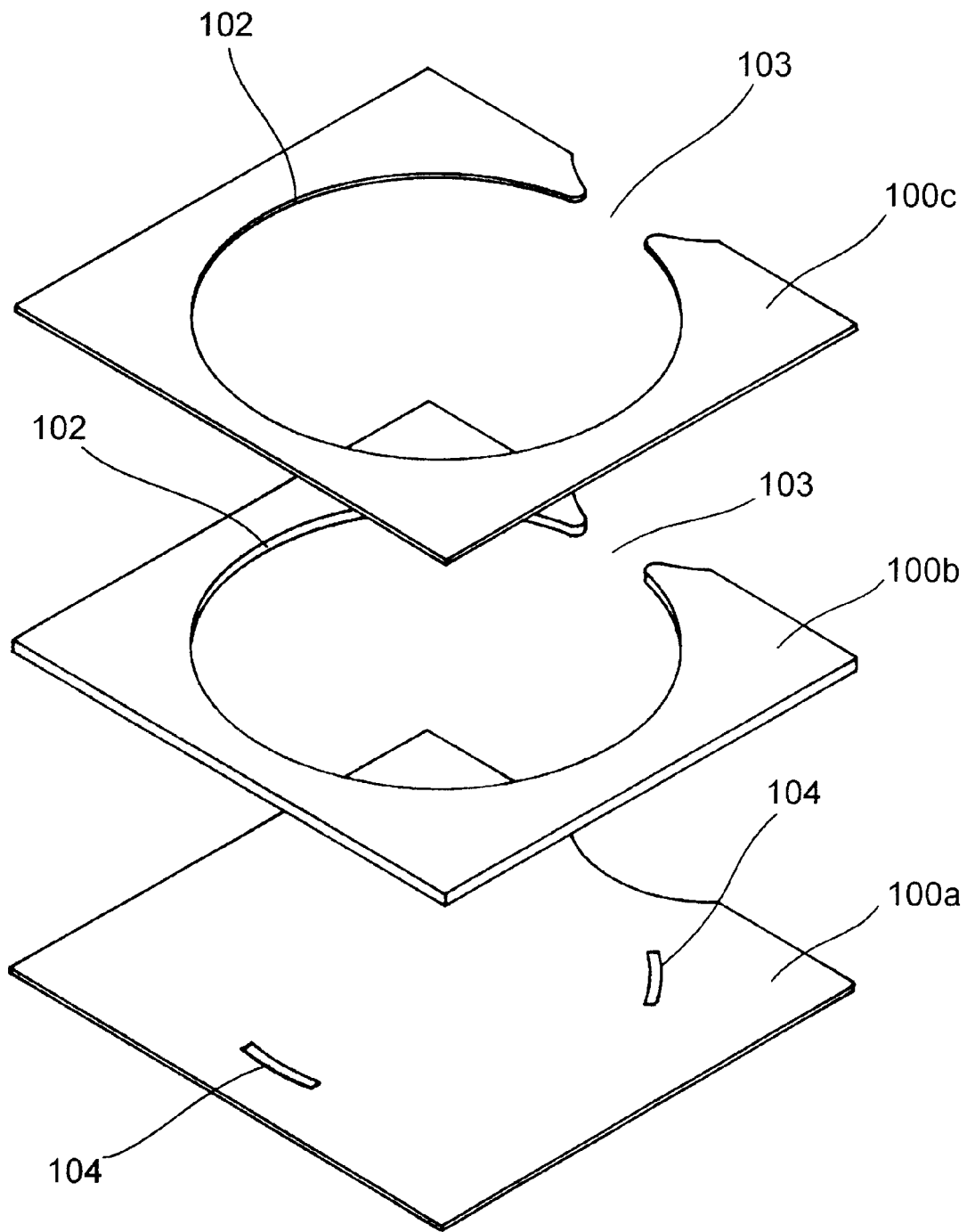
FIG. 6 is an exploded perspective view showing the prior art disc case.

As shown in FIGS. 3 and 4, the two flanges 17 of the top member 12 extending from the top edge of the circular opening 13 of the intermediate member 11 on both sides of the opening 16 of the top member 12, engage the top of opposed edge portions of the accommodated disc 4, and the disc 4 can be reliably prevented from its occasional detachment. In addition, the accommodated disc 4 is held raised by the ring-like ridge 6 formed in the recess 3 at the center thereof and also held raised, in the finger access recess 5, by the ridge 6 formed in the boundary between the bottom of the finger access recess 5 and the bottom of the disc accommodation recess 3. Thus, the disc can be smoothly raised by inserting a finger in the finger access recess 5.

Particularly, the ridge 7 in the finger access recess has the central curved portion 7a that is convex toward the disc accommodation recess 3. Thus, a finger can be deeply inserted under the bottom of the disc 4, and the disc 4 can be more reliably raised and smoothly removed.

The accommodation and the removal of the disc 4 according to the invention will now be described.

To accommodate the disc 4 in the disc case 1, the user holds the disc 4 with fingers, and inserts the disc 4 with the front end thereof downwardly tilted into the underside of one of the flanges 17 in the disc case 1. When the front end of the disc has reached the will of the circular opening in the intermediate member 11, the user gradually lowers the rear end of the disc. In this way, the disc 4 is automatically accommodated in the disc accommodation recess 3 in the disc case 1.

To remove the disc accommodated in the disc case 1, the user inserts a finger into the finger access recess 5, and raises the rear end of the disc in the state held raised by the ridge 6. Then, upon pushing the disc 4 against the flange 17 on the side opposite the finger access recess 5, the user holds a portion of the disc between the center hole and the edge thereof with fingers, and pulls out the disc 4 obliquely upward from the finger access recess 5. In this way, the disc 4 can be readily taken out.

As has been described in the foregoing, the disc case according to the invention is made of paper, and thus it can be readily recycled without generation of harmful matter by burning.

Also, the disc case can be manufactured to have the same dimensions as those of disc cases made of synthetic resins so that it can be put together with CDs in the same rack in any shop. Furthermore, since the top member, the bottom member and the lid which also serves as a cover are made of paper, the disc case can have printing applied thereto so that it is possible to provide an integral design print on the entirety of disc case surfaces.

Still further, without the presence of a center holder part, which is provided in a synthetic resin disc case and is liable to cause scars and scratches on the disc around the center hole thereof and to have adverse effects on the read-out performance of the disc, the disc can be smoothly accommodated and removed, and the accommodated disc can be reliably kept without the possibility of occasional detachment.

Particularly, without the presence of a notch, which is present in the prior art disc case as a finger access part for accommodating and removing the disc and which exposes part of the edge of the accommodated disc, it is possible to accommodate and remove the disc more smoothly owing to the finger access recess and the ridge having the central curved portion, which is formed on the boundary between the finger access recess and the disc accommodation recess and serves to hold the disc in a raised condition.

Since no notch exposing part of the disc is thus present, unlike the prior art, no difficult operation is necessary such as lining up a plurality of sheets individually having notches into a neat state with aligned notch ends.

Moreover, it is possible to obviate the prior art drawbacks of generation of scars and scratches on the disc from the outside and attachment of dust particles on the disc due to partial exposure thereof in the notch. This effect, together with the integrally joined lid, permits maintaining a seal, which is most necessary for the protection of this type of disc, thus permitting perfect protection of the disc.

What is claimed is:

1. A disc case comprising a board having a disc accommodation recess for accommodating a disc, also having flanges extending from a top edge of the disc accommodation recess for being contacted with a top edge of the accommodated disc and preventing occasional detachment thereof, and further having a recess extending as a finger access recess from part of an edge of the disc accommodation recess for accommodating and removing the disc, wherein the board comprises a bottom member, an intermediate member disposed atop the bottom member and having a circular opening constituting part of the disc accommodation recess and an opening constituting part of the finger access recess, and a top member having a generally circular opening constituting part of the disc accommodation recess and smaller in diameter than the circular opening in the intermediate member so as to provide the flanges.

2. The disc case according to claim 1, wherein the disc case is made of paper.

3. The disc case according to claim 1, wherein the diameter of the circular opening in the intermediate member that constitutes part of the disc accommodation recess is greater than the outer diameter of the disc to be accommodated therein only very slightly in order to prevent as much as possible the movement of the accommodated disc in a clearance between the disc and a wall of the disc accommodation recess.

4. The disc case according to claim 1, wherein the generally circular opening in the top member that constitutes part of the disc accommodation recess is oval such that the flanges are formed only along its opposed side edge parts so as to extend from a top edge of the circular opening of the intermediate member toward the accommodated disc.

5. The disc case according to claim 4, wherein the flanges formed on the top member oppose each other on both sides of the opening constituting part of the finger access recess.

6. The disc case according to claim 1, wherein the board has a ridge is formed on a bottom surface of the disc accommodation recess for holding the accommodated disc raised from the bottom surface.

7. The disc case according to claim 1, further comprising a lid foldably joined to one side of the board for covering the disc accommodation recess thereof.

8. The disc case according to claim 7, wherein a jacket accommodation pocket is formed on an inner surface of the lid.

9. A disc case comprising a board having a disc accommodation recess for accommodating a disc, also having flanges extending from a top edge of the disc accommodation recess for being contacted with a top edge of the accommodated disc and preventing occasional detachment thereof, and further having a recess extending as a finger access recess from part of an edge of the disc accommodation recess for accommodating and removing the disc, wherein the board has a ridge formed in the neighborhood of the boundary between the bottom of the finger access recess and the bottom of the disc accommodation recess for holding the accommodated disc raised from a bottom surface, wherein the ridge formed in the neighborhood of the boundary between the bottom of the finger access recess and the bottom of the disc accommodation recess has a central curved portion that is convex toward the disc accommodation recess.

10. The disc case according to claim 9, wherein the disc case is made of paper.

11. The disc case according to claim 9, wherein the board has a ridge is formed on a bottom surface of the disc accommodation recess for holding the accommodated disc raised from the bottom surface.

12. The disc case according to claim 9, further comprising a lid foldably joined to one side of the board for covering the disc accommodation recess thereof.

13. The disc case according to claim 12, wherein a jacket accommodation pocket is formed on an inner surface of the lid.

\* \* \* \* \*